United States Patent
Couchot et al.

(10) Patent No.: US 8,392,894 B2
(45) Date of Patent: Mar. 5, 2013

(54) METHOD AND SYSTEM FOR TRANSLATING BETWEEN DISPARATE DATA OBJECT MODELS

(75) Inventors: John T. Couchot, McKinney, TX (US); David V. Collins, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3077 days.

(21) Appl. No.: 10/448,549

(22) Filed: May 30, 2003

(65) Prior Publication Data

US 2004/0243717 A1 Dec. 2, 2004

(51) Int. Cl.
*G06F 9/45* (2006.01)
*G06F 9/46* (2006.01)

(52) U.S. Cl. .................................. 717/136; 719/328
(58) Field of Classification Search .................. 717/136, 717/137
See application file for complete search history.

(56) References Cited

U.S. PATENT DOCUMENTS

| | | | |
|---|---|---|---|
| 2002/0019844 A1* | 2/2002 | Kurowski et al. | 709/201 |
| 2002/0156688 A1* | 10/2002 | Horn et al. | 705/26 |
| 2003/0001893 A1* | 1/2003 | Haley | 345/762 |
| 2003/0023609 A1* | 1/2003 | Della-Libera et al. | 707/101 |
| 2003/0208493 A1* | 11/2003 | Hall et al. | 707/100 |
| 2005/0187944 A1* | 8/2005 | Acheson et al. | 707/100 |
| 2006/0143267 A1* | 6/2006 | Smithline et al. | 709/203 |

OTHER PUBLICATIONS

Dino Esposito, "Revisiting the Use of ADO in .NET Applications", Aug. 9, 2001, accessed and printed online on Feb. 28, 2007 at <http://msdn2.microsoft.com/en-us/library/ms810295.aspx>, 8 pages.*
Johnny Papa, "Data Points: Using the ADO.NET DataSet for Multitiered Apps", Jan. 2002, Microsoft Corporation, MSDN Magazine, 9 pages.*
Lefebvre et al. "Sams Teach Yourself ADO.NET in 24 Hours" May 10, 2002, Sams Publishing, Excerpts from "Hour 2", 4 pages.*
Feddema, "DAO Object Model: The Definitive Reference", Jan. 2000, O'Reilly Publishing, 1st Edition, Chapter 8.*
Busby et al., "Microsoft.net/com Migration and Interoperability", Aug. 2001, pp. 1-14.
Eckert et al., "ADO und ADO.NET", Apr. 2003, pp. 21-31.
Gamma et al., "Design Patterns", 1995, pp. 139-145.

* cited by examiner

*Primary Examiner* — James D Rutten

(57) ABSTRACT

A method and system is provided for using an active server page program in a universal web-based active server page framework. The active server page program has associated recordset objects within an active server page framework. The universal web-based active server page framework has associated dataset objects with data structure requirements which are incompatible with data structure requirements associated with the recordset objects. The method and system communicate recordset objects from the active server page program to a recordset-dataset translation mechanism. The dataset objects communicate between the universal web-based active server page program environment and the recordset-dataset translation mechanism. Translating dataset objects to corresponding recordset objects occurs within the recordset-dataset translation mechanism for transmitting data within the dataset objects to the active server page program of the active server page framework.

13 Claims, 5 Drawing Sheets

METHOD AND SYSTEM FOR TRANSLATING BETWEEN DISPARATE DATA OBJECT MODELS

TECHNICAL FIELD OF INVENTION

The present invention relates to distributed component-based computer software applications, and more particularly relates to translating between disparate data object models in an object oriented computing environment.

BACKGROUND OF THE INVENTION

In many information processing applications, a server application runs on a host or server computer in a distributed network. The server application provides processing services for client applications running on terminal or workstation computers operated by a multitude of users on the network. This is sometimes referred to as client/server computing.

In a form of client/server computing sometimes known as "distributed objects," the server application includes a set of components conforming to an object-oriented programming (OOP) model, such as the Microsoft Component Object Model (COM) and Distributed Component Object Model (DCOM), the IBM System Object Model (SOM), the Object 'Management Group's Common Object Request Broker Architecture (CORBA), and others. Object-oriented programming generally has advantages in ease of programming, extensibility, reuse of code, and integration of software from different vendors and (in some object-oriented programming models) across programming languages.

One type of OOP environment is that of Web-based services. These services, due to their wide-spread use and technological progress, have developed at least two generations of Web services technology. The first-generation of Web services includes the use of open standards, universal access, rapid development, and continuous deployment. The second-generation Web services environment uses execution environments and tools that take care of infrastructures and operations so developers may focus on creating applications. These tools include the use of XML for universal representation, exchange and storage of all kinds of data, as well as for describing and manipulating component interfaces. One type of second-generation Web services environment for programming is offered by Microsoft Corporation and is known as the ".NET environment." The .NET environment aims to make component construction and reuse of Web services applications easier than they have been previously.

The benefits of using a Web services language such as .NET common language technology may be clear, but they are less immediate and less certain than many programmers desire. In fact, the .NET environment suffers from certain limitations. Moreover, because of these limitations, programmers now using Active Server Pages (ASP), Visual Basic Script, Visual Basic and C++ skills are likely to find transitioning to the .NET environment platform particularly challenging. For example, VB.NET, which is one example of a .NET environment Visual Basic language, departs dramatically from earlier Visual Basic versions. It approaches object orientation, components and exception handling more like the newer C# language than does any previous Visual Basic language.

Still another limitation with the .NET environment has to do with the presentation layers created within the .NET environment. These presentation layers use the .NET ASP application, ASP.NET, and are very different from the pages written in the classic ASP framework. The classic ASP framework provides for application development of user interfaces or presentation layers. The ASP framework permits creating interactive pages as part of a Web-based application. To a degree, the ASP framework enables developers to separate programming logic from page design through the use of components that are called from the page itself. The ASP framework allows developers to separate content generation from layout by accessing components from the page, using a combination of tags and scripting to create dynamic Web pages.

The existing software to support the presentation layers created in the classic ASP framework cannot effectively interface with the .NET data access environment, ADO.NET. This is due to the ADO.NET environment's not supporting ActiveX Data Objects Database RecordSets (also called "ADODB.RecordSets"). The ADODB.RecordSet makes possible communication between a business tier and the data tier in database calls within the ASP framework. Unfortunately, ADODB.RecordSets are not supported in the ADO-.NET environment, despite the fact that the classic ASP framework uses ADODB.RecordSets repeatedly for processing result sets from database calls. Many Internet applications have been developed using Microsoft ASP and Visual Basic version 6 (Visual Basic.6) components that employ ADODB.RecordSets. In fact, Microsoft ASP and Visual Basic.6 presently are somewhat ubiquitous languages for the Web services environment.

The newer .NET environment, which includes VB.NET (Visual Basic) and ASP.NET (Active Server Pages), do not support ADO.NET and ADODB.RecordSets equally. Instead of using ADODB.RecordSets, the ADO.NET framework uses an alternative structure, called the DataTable. Unfortunately, the DataTable does not directly interface with ADODB.RecordSets, and use of data within ADODB.RecordSets requires the use of a tool called "COM Interopt" to allow .NET components to access an ADODB.RecordSet. This slows execution times with each interaction between the classic ASP framework page and VB.NET component due to the need to call COM Interopt three times. A first call occurs so that the classic ASP framework can call the VB.NET component. A second call occurs to supply the ADODB.RecordSet to VB.NET. Still a third call loads the ADODB.RecordSet from an ADO.NET DataTable. The speed reductions that these calls impose on ASP applications may require many internet applications written in the classic ASP framework to be re-written to use ASP.NET, VB.NET, and ADO.NET for them to operate properly. To make this conversion, however, is so time-consuming and labor-intensive that very few applications can economically migrate to the .NET environment.

SUMMARY OF THE INVENTION

In accordance with the present invention, a method and system for translating between a classic ASP framework and a next-generation ASP framework is provided that avoids or substantially eliminates problems and limitations associated with prior such methods and systems.

In one embodiment of the invention, there is provided a system that leaves unchanged the front end classic ASP framework, while changing the middle tier of business logic that communicates in the VB.NET language. The present invention achieves this result by use of a DataTable wrapper object that appears to be a RecordSet to the classic ASP framework.

According to another aspect of the present invention, a method and system are provided for translating between a first data object model and a second data object model, which data object models include incompatible data structures. The process includes the steps of receiving a recordset call from the first data object model. The process, in turn, translates the recordset call into a dataset call. Then, the process transmits the dataset call to the second data object model.

According to still another aspect of the invention, a method and system is provided for using an active server page program in a universal web-based active server page framework. The active server page program has associated recordset objects within an active server page framework. The universal web-based active server page framework has associated dataset objects with data structure requirements which are incompatible with data structure requirements associated with the recordset objects. The method and system communicate recordset objects from the active server page program to a recordset-dataset translation mechanism. The dataset objects communicate between the universal web-based active server page program environment and the recordset-dataset translation mechanism. Translating dataset objects to corresponding recordset objects occurs within the recordset-dataset translation mechanism for transmitting data within the dataset objects to the active server page program of the active server page framework.

The present invention allows leaving an existing classic ASP framework Internet application unchanged while changing a backend business tier VB.NET component. Because the presentation layer has been written in ASP and the presentation layer writing represents the bulk of the development work for web applications, the present invention avoids the need to readily convert an ASP application program to an ASP.NET application program. The present invention provides a device called a DataTableRecordSet through which the system calls a COM Interopt function only to communicate with VB.NET. Accordingly, execution times using the method of the present invention operate faster than when the original classic ASP framework communicates with Visual Basic.6. The present invention creates a DataTableRecordSet class of objects, which may be used in the classic ASP framework without any changes to the ASP screens as the application interfaces with the .NET environment framework.

The present invention avoids frequent and intensive use of the COM InterOpt function to limit the processing speed reduction associated with such use. By making the classic ASP framework presentation layer appear to be an ASP.NET application, the present invention provides a way to reduce the scope of even the most complex migration from the classic ASP framework to the ASP.NET platform.

Other technical advantages arising from the present invention will readily apparent to those skilled in the art from a careful reading of the following figures, description, and claims.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF PREFERRED EMBODIMENT

One embodiment of the present invention and its advantages are best understood by referring to FIGS. 1 through 6 of the drawings, like numerals being used for like and corresponding parts of the various drawings.

Figure 1:
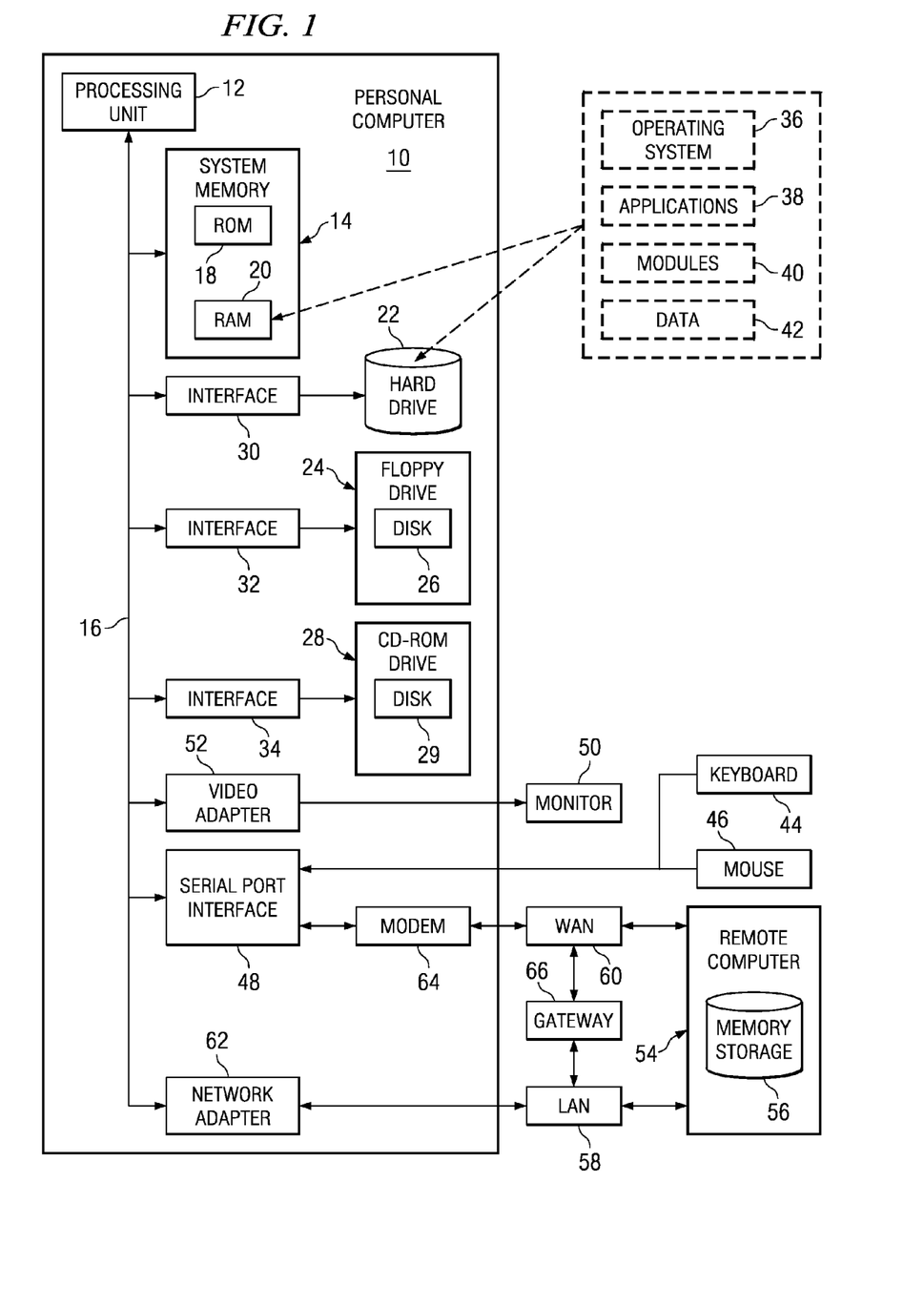
FIG. 1 is a block diagram of a computer system that may implement a method and apparatus embodying the present invention.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional computer 10 (such as personal computers, laptops, palmtops, set tops, servers, mainframes, and other variety computers), including a processing unit 12, system memory 14, and system bus 16 that couples various system components including system memory 14 to the processing unit 12. Processing unit 12 may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 12.

System bus 16 may be any of several types of bus structure including a memory bus or memory controller, a peripheral bus, and a local bus using any of a variety of conventional bus architectures such as PCI, VESA, AGP, Microchannel, ISA and EISA, to name a few. System memory 14 includes read only memory (ROM) 18 and random access memory (RAM) 20. A basic input/output system (BIOS), containing the basic routines that help to transfer information between elements within the computer 10, such as during start-up, is stored in ROM 18.

Computer 10 further includes a hard disk drive 22, a floppy drive 24, e.g., to read from or write to a removable disk 26, and CD-ROM drive 28, e.g., for reading a CD-ROM disk 29 or to read from or write to other optical media. The hard disk drive 22, floppy drive 24, and CD-ROM drive 28 are connected to the system bus 16 by a hard disk drive interface 30, a floppy drive interface 32, and an optical drive interface 34, respectively. The drives and their associated computer-readable media provide nonvolatile storage of data, data structures, computer-executable instructions, etc. for computer 10. Although the description of computer-readable media provided above refers to a hard disk, a removable floppy and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 20, including an operating system 36, one or more application programs 38, other program modules 40, and program data 42. A user may enter commands and information into the computer 10 through a keyboard 44 and pointing device, such as a mouse 46. Other input devices (not shown) may include a microphone, joystick, game pad, satellite dish, scanner, or the like. These and other input devices are often connected to the processing unit 12 through a serial port interface 48 that is coupled to the system bus, but may be connected by other interfaces, such as a parallel port, game port or a universal serial bus (USB). A monitor 50 or other type of display device is also connected to the system bus 16 via an interface, such as a video adapter 52. In addition to the monitor, computers typically include other peripheral output devices (not shown), such as speakers and printers.

Computer 10 may operate in a networked environment using logical connections to one or more remote computers, such as a remote computer 54. The remote computer 54 may be a server, a router, a peer device or other common network node, and typically includes many or all of the elements described relative to the computer 10, although only a memory storage device 56 has been illustrated in FIG. 1. The logical connections depicted in FIG. 1 include a local area network (LAN) 58 and a wide area network (WAN) 60. Such networking environments are commonplace in offices, enterprise-wide computer networks, intranets and the Internet.

When used in a LAN networking environment, the computer 10 is connected to the LAN 58 through a network interface or adapter 62. When used in a WAN networking environment, computer 10 typically includes a modem 64 or other means for establishing communications (e.g., via the LAN 58 and a gateway or proxy server) over the wide area network 60, such as the Internet. Modem 64, which may be internal or external, is connected to the system bus 16 via the serial port interface 48. In a networked environment, program modules depicted relative to the computer 10, or portions thereof, may be stored in the remote memory storage device 56. It will be appreciated that the network connections shown are exemplary and other means of establishing a communications link between the computers may be used.

FIG. 1 only provides one example of a computer that may be used with the invention. The invention may be used in computers other than general-purpose computers, as well as on general-purpose computers without conventional operating systems.

Figure 2:
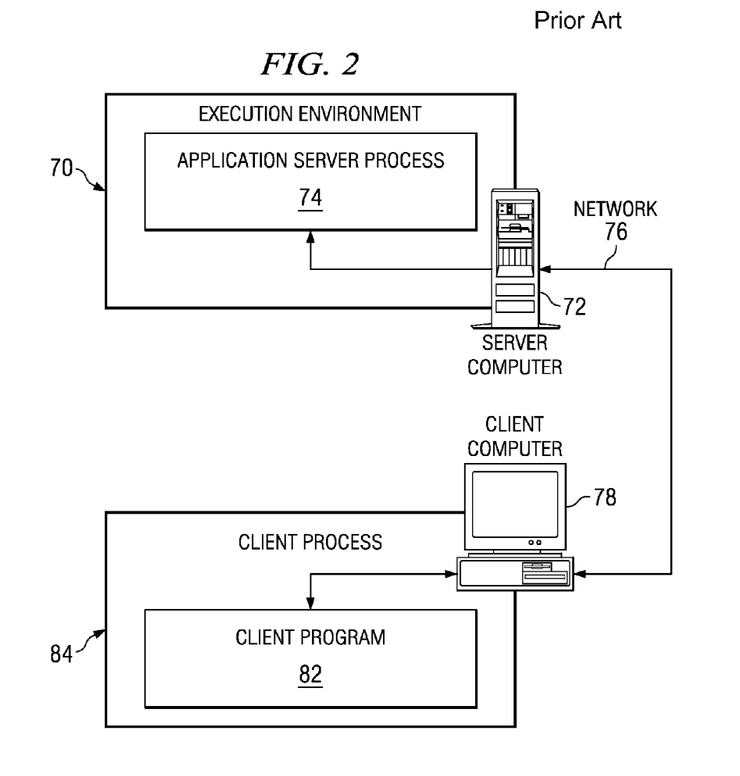
FIG. 2 is a block diagram of an execution environment and runtime architecture for employing the illustrated embodiment of the invention.

With reference now to FIG. 2, the COM+ component of the Microsoft Windows 2000 operating system provides run-time or system services to create a run-time object execution environment 70 on a server computer 72. The COM+ component is implemented as a dynamic link library ("DLL"), which is a well-known executable file format which allows dynamic or run-time linking of executable code into an application program's process. The COM+ DLL is loaded directly into application server process 74 that hosts component application objects, and runs transparently in the background of these processes.

The illustrated application server process 74 is a system process that hosts execution of component application objects. Each application server process 74 can host multiple component application objects that are grouped into the COM+ application. Also, multiple application server processes 74 can execute on server computer 72 under a multi-threaded, multi-tasking operating system (e.g., Microsoft Windows 2000 in the illustrated embodiment).

In a typical installation shown in FIG. 2, execution environment 70 is on server computer 72 (which may be an example of computer 10, described above) that is connected in a distributed computer network 76 comprising a large number of client computers 78 which access component application objects in execution environment 70. Alternatively, execution environment 70 may reside on a single computer and host component application objects accessed by client processes also resident on that computer. Client computer 78, in accessing objects in execution environment 70, uses client program 82 within client process 84.

Server computer 72 executes component applications that are developed as a .NET Assembly containing a group of component application objects. For example, component application objects that are hosted in execution environment 70 of application server process 74 may implement the business logic of a client/server application, such as the code to manage class registrations in a university's registration application or orders in an on-line sales application. Typically, each component application comprises multiple components, each of which contains program code for a portion of the application's work.

The component application objects in execution environment 70 conform to the Microsoft Component Object Model ("COM") specification (i.e., are implemented as a "COM Object") and are executed using the COM+ services of the Microsoft Windows 2000 Server operating system, but alternatively may be implemented according to other object standards (including the CORBA (Common Object Request Broker Architecture) specification of the Object Management Group, and Java Beans by Sun Microsystems, Inc.) and executed under object services of another operating system. The COM specification defines binary standards for objects and their interfaces which facilitate the integration of software components into applications. (For a detailed discussion of COM and OLE, see Kraig Brockschmidt, Inside OLE, Second Edition, Microsoft Press, Redmond, Wash. (1995)).

Within execution environment 70, application server process 74 makes use of the ASP framework. These ASP components constitute middle or business rule layer components of relevant portions of application server process 74. This framework is responsible for encapsulating the majority of an application's transaction and database logic. For example, the logic for a complex calculation that requires access to several database tables may reside within a portion of the ASP framework that is part of application server process 74. The portion of the ASP framework would then be invoked by other portions of the ASP framework during execution of one or more of application server processes 74.

Within execution environment 70, the ASP framework executes ActiveX Scripts and ActiveX Components on server computer 72. The ASP framework allows creation of interactive and personalized web pages for a Web site or corporate intranet without program directly the internals of a Web server or complex application programming interfaces. In addition, the ASP framework is extensible via software components written using Microsoft's Component Object Model, thus making if possible to take advantage of software that may be already written using languages such as Visual Basic, C++ or Java.

The ASP framework provides a series of DLLs installed on a Web server by either a stand-alone installation program or as part of the Visual Studio 97 setup. These DLLs provide the ability to interpret and process information via the use of a script file (called an ASP script) that is resident in a Web application directory. The ASP framework permits a Web browser to request scripts containing ASP script, usually in the form of VBSCRIPT or JSCRIPT. When requested, these scripts execute in the ASP framework, instead of being simply returned to the browser and produce output for sending back to the requesting browser. The ASP framework establishes an environment having interactivity used to activate a Web site.

The Visual Basic.6 component within the ASP framework includes approximately fifteen (15) different classes or objects and includes simple business logic permitting requests from the presentation layer to interact with databases written in ASP.NET. The Visual Basic.6 component uses a RecordSet as the package within which to communicate with the presentation layer and the business tier. The RecordSet also communicates between the business tier and the data tier.

In the .NET environment, many of the functions of the ASP framework are performed by the ASP.NET framework. The ASP.NET framework provides compiled common language runtime code running on the server computer 72 (FIG. 2), for example. Unlike the classic ASP framework, the ASP.NET framework may take advantage of early binding, just-in-time compilation, native optimization, and caching services more readily than can the ASP framework. The ASP.NET framework defines an application as the sum of all files, pages, handlers, modules, and executable code that can be invoked or run in the scope of a given virtual directory (and its subdirectories) on a Web application server. Each ASP.NET framework application on a Web server is executed within a unique .NET environment application domain.

Figure 3:
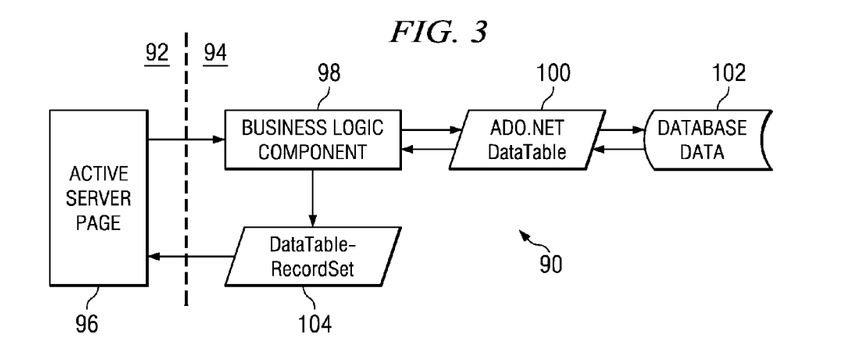
FIG. 3 portrays the process of the present invention for dynamically translating between disparate data object models.

FIG. 3 shows process 90 for translating between the ASP framework 92 and the ASP.NET framework 94 of the .NET environment. In FIG. 3, ASP 96 of ASP framework 92 makes a call to Business Logic Component 98 within the ASP.NET framework 94. Business Logic Component 98 processes the call from ASP 96. In response, Business Logic Component 98 creates ADO.NET DataTable 100 and accesses Database 102 to retrieve data. Database 102 sends the retrieved data to ADO.NET Data Table 100 in Business Logic Component 98.

Instead of transmitting the retrieved ADO.NET DataTable 100 directly to ASP 96 of ASP framework 92, business logic component 98 transmits the retrieved ADO.NET DataTable 100 to DataTableRecordSet object 104. DataTableRecordSet object 104 makes the retrieved ADO.NET DataTable 100 appear to be a RecordSet. Then, DataTableRecordSet 104 is returned to ASP 96 within ASP framework 92. Thus, ASP provides a presentation layer within classic ASP framework 92, which makes a call to a method within business logic component 98 that is written in VB.NET and makes a call to Database 102. VB.NET uses ADO.NET to send a query to the database to receive back DataTable 100 in the .NET environment. DataTable 100 is returned from Database 102 to business logic component 98. Business Logic Component 98 then transforms DataTable 100 into DataTableRecordSet 104. DataTableRecordSet 104 is a class that has been created in VB.NET, a class which includes a number of methods which are each of the signatures for the ADODB.RecordSet object. The DataTableRecordSet 104 provides a wrapper around DataTable 100 for handing the wrapped object back to classic ASP framework 92. So the wrapped DataTable 100 is within DataTableRecordSet 104 which possesses the methods and properties that are supported by the ADODB.RecordSet. Classic ASP framework 92 treats the DataTableRecordSet 104 object as an ADODB.RecordSet.

Figure 4:
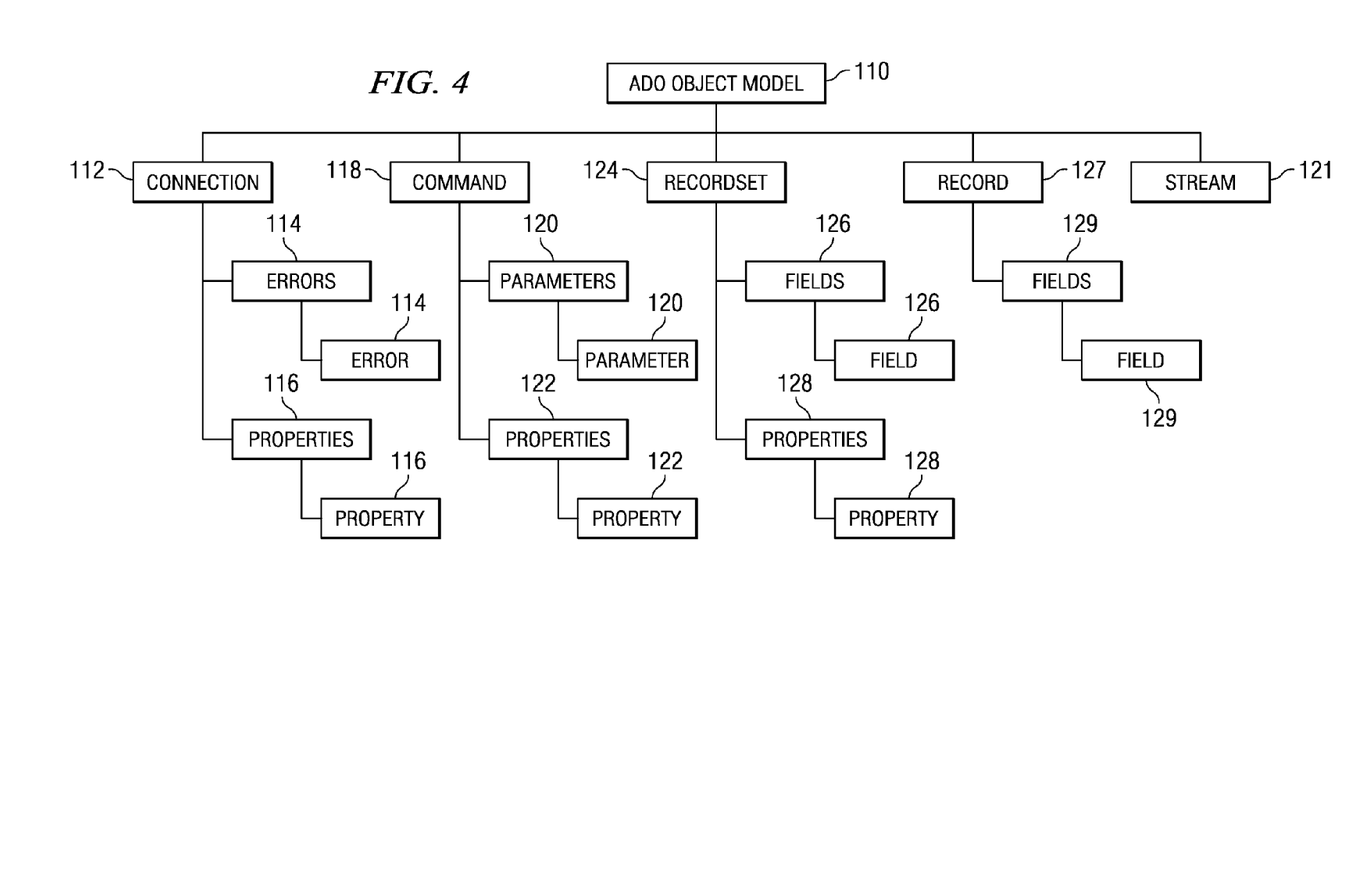
FIG. 4 illustrates a first data object model with which the present invention interfaces.

FIG. 4 shows the active data objects (ADO) object that operates within ASP framework 92 of FIG. 3. ADO object model 110 includes certain primary objects. These primary objects include Connection object 112, which associates with the secondary Error objects 114 and Properties objects 116. Command object 118 includes Parameters objects 120 and Properties objects 122. ADO object model 110 further includes RecordSet object 124, which includes Fields objects 126 and Properties objects 128. Furthermore, ADO object model 110 includes Record object 130 and Stream object 132. Record object 132 may include Fields objects 134.

Four primary objects in ADO object model 110 establish the ADO programming environment. These objects include Connection object 112 for establishing and managing connections to a database. RecordSet object 124 manages a collection of records. RecordSet object 124 contains navigational methods to move to a particular record. Fields object 126 provides the collection of fields associated with a record in RecordSet object 124. The values within the Field objects 126 change as different navigational methods are used to move around RecordSet object 124. Command object 118 is an object used to access stored procedures or parameterized SQL statements.

Figure 5:
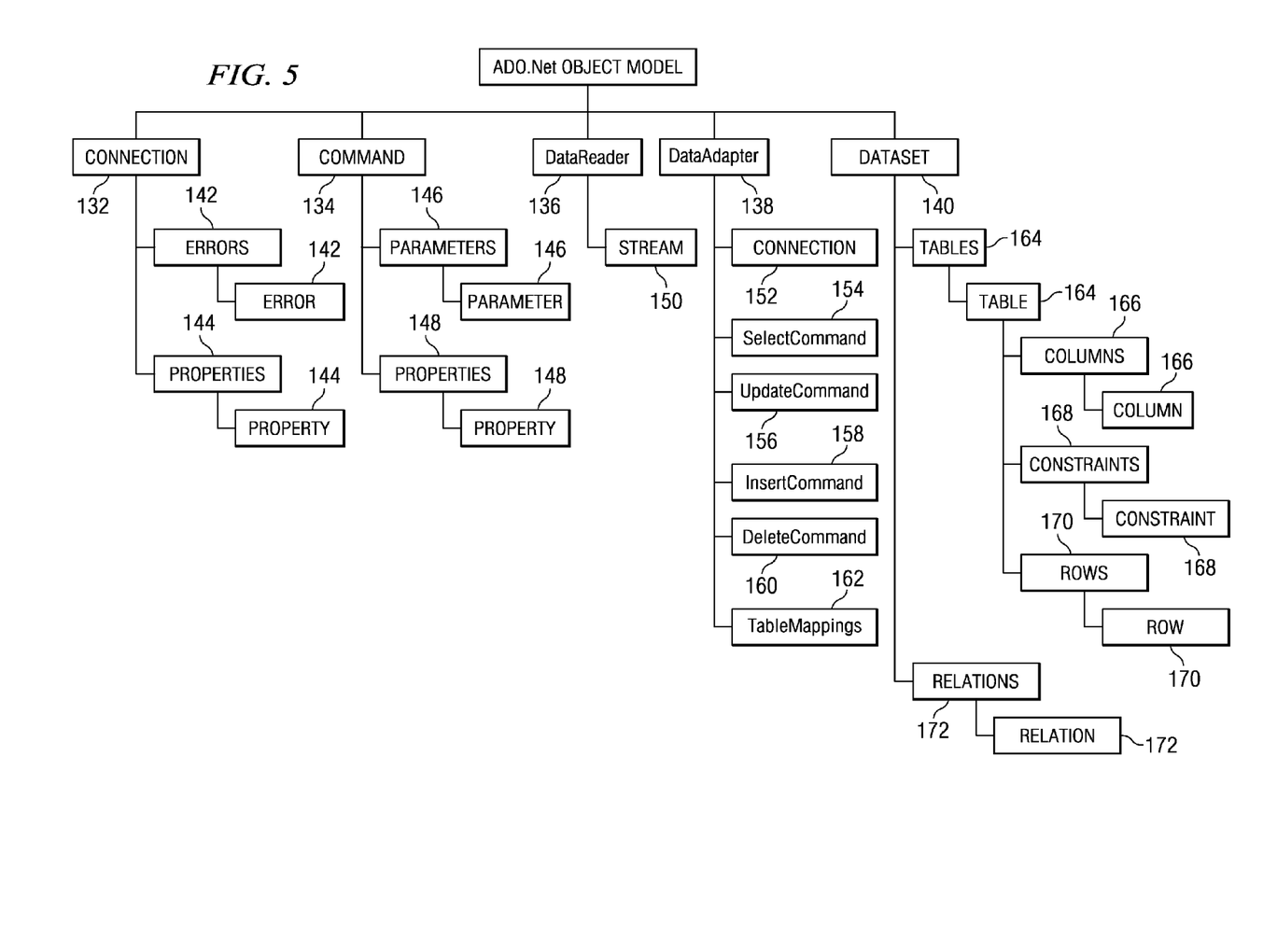
FIG. 5 shows a second data object model with which the present invention interfaces.

FIG. 5 shows ADO.NET object model 130 structure and its associated primary and secondary objects. Migration to the ASP.NET framework 94 for applications originally created in the ASP framework 92 requires the use of a separate file name extension (.aspx instead of .asp), separate configuration settings, and an entirely separate common language runtime. As was the case with ADO object model 110 of FIG. 4, ADO-.NET object model 130, includes as primary objects several that are similar to ADO objects, such as Connection object 132 and Command object 134, and also introduces new objects. Key new ADO.NET objects include the DataReader object 136, DataAdapter object 138 and DataSet object 140.

Each of the primary objects includes one or more secondary objects. Connection object, therefore, includes Errors objects 142 and Properties objects 144. Command object 134 includes Parameters objects 146 and Properties objects 148. DataReader object 136 includes Stream object 150.

DataAdapter object 138 includes a number of secondary Connection and Command objects, including Connection object 152, SelectCommand object 154, UpdateCommand object 156, InsertCommand object 158, DeleteCommand object 160, and TableMappings objects 162.

DataSet object 140 of FIG. 5 includes Tables objects 164, which may further include other Table objects 164, as well as Columns objects 166, Constraints objects 168, and Rows objects 170. In addition, DataSet object 140 includes Relations objects 172.

Functions associated with these objects have not changed in the present invention from their original functions as provided in the ADO.NET framework as provided by Microsoft Corporation. However, their listing here is for further explanation of the associated context of the present invention. Accordingly, published literature and operations manuals relating to ADO and the ASP framework and ADO.NET and the ASP.NET framework are here expressly incorporated by reference.

DataSet object 140 is similar to the ADODB.RecordSet object 124, but with the important distinction that the DataSet object 140 is always disconnected. DataSet object 140 represents a cache of data, with database-like structures such as tables, columns, relationships, and constraints. However, though DataSet object 140 can and does behave much like a database, it is important to remember that DataSet objects 140 do not interact directly with databases, or other source data. This allows the developer to work with a programming model that is always consistent, regardless of where the source data resides. Data coming from a database, an XML file, from code, or user input can all be placed into DataSet objects 140. Then, as changes are made to DataSet object 140 they can be tracked and verified before updating the source data.

With DataSet object 140, the origin of data is immaterial. DataSet object 140 will always present a consistent programming model using a collection of data with relational database characteristics. While DataSet object 140 has no knowledge of the source of its data, the managed provider has detailed and specific information. The role of the managed provider is to connect, fill, and persist DataSet object 140 to and from data stores.

DataAdapter object 138 is the object that connects to the database to fill DataSet 140. Then, it connects back to the database to update the data there, based on operations performed while the DataSet 140 held the data. Whereas RecordSet object 124 is primarily connection-based, when using DataSet object 140, data processing is message-based and revolves around chunks of information. In this approach, the DataAdapter object 138 provides a bridge to retrieve and save data between DataSet object 140 and its source data store. It accomplishes this by means of requests to the appropriate SQL commands made against the data store.

Referring briefly to FIG. 3, DataTableRecordSet object 104 of the present invention provides a wrapper to the .NET environment DataTable 100 with properties and methods which behave like properties and methods of an ADODB.RecordSet. These members are New, Dispose, Fields, EOF, BOF, AbsolutePosition, AbsolutePage, RecordCount, PageSize, PageCount, MoveNext, MovePrevious, MoveFirst, MoveLast, and Move. To the classic ASP framework 92 pages, the .NET environment DataTableRecordSet object 104 looks and behaves like an ADODB.RecordSet even though it actually contains an ADO.NET DataTable 100. As a result, the present invention provides an ASP framework 92 application the ability to be used much more readily, while allowing a slower migration to VB.NET language. This eliminates the need to completely rebuild an ASP application program within the .NET environment using the ASP.NET framework.

Figure 6:
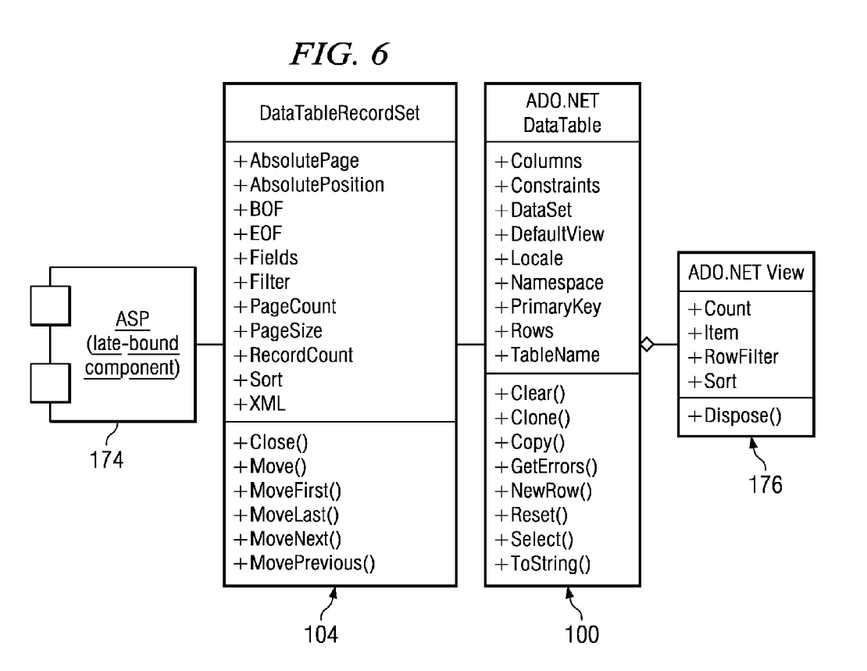
FIG. 6 depicts one aspect of the data object model translation system of the present invention.

FIG. 6, therefore, illustrates how the use of DataTableRecordSet object 104 makes useful to ASP framework 92 a DataTable 104 from the ASP.NET framework 94. DataTableRecordSet object 104 makes use methods to do operations of an ADODB.RecordSet with data contained in an ADO.NET DataTable object. The DataTableRecordSet object 104 includes the properties and methods of an ADODB.RecordSet object.

FIG. 6 depicts how DataTableRecordSet object 104 causes a DataTable object 100 to appear to be an ADODB.RecordSet object 124 to a late-bound client 174, such as an ASP. Note that DataTableRecordSet object 104 contains DataTable object 100. DataTableRecordSet object 104 maps indirectly to methods within DataTable 100.

FIG. 6 further shows the example of an ASP using the DataTableRecordSet object 104. In this example, a MoveNext method of an ADODB.RecordSet object 124 was used to advance to its next record and access information therein. This MoveNext method was written in the ASP framework 92 using a RecordSet object 124, which ADO.NET does not support. However, DataTableRecordSet object 104 supplies a current record pointer value for the MoveNext method. This step allows the ASP to continue to access information via the ADO.NET, without the ASP having to be modified. The present invention, by supplying a current record pointer value for the associated method, reduces the COM Interopt overhead to one call as an ASP application program, as the ASP application interfaces with the .NET Framework Assembly.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for translating between a first data object model and a second data object model, which data object models include incompatible data structures, comprising:
   receiving a first recordset object call for obtaining a recordset object from the first data object model;
   translating the first recordset object call into a dataset object call, said dataset object call for obtaining a dataset object;
   transmitting the dataset object call to the second data object model; and
   receiving said recordset object as a plurality of navigational methods for navigating within a universal web-based active server page framework.

2. The method of claim 1, further comprising:
   obtaining a dataset object in response to said dataset object call;
   translating said dataset object into a second recordset object; and
   transmitting said second recordset object to said first data object model.

3. The method of claim 1, further comprising translating the first recordset object call into the dataset object call within a business logic component associated with said universal web-based active server page framework.

4. The method of claim 1, further comprising translating the first recordset object call into the dataset object call for calling a plurality of table objects within said universal web-based active server page framework.

5. The method of claim 1, wherein receiving the first recordset object call, translating the first recordset object call, transmitting the dataset object call, and receiving said recordset object are performed by a system having a processor.

6. A system comprising:
   at least one processor to:
      receive a first recordset object call for obtaining a recordset object from the first data object model;
      translate the first recordset object call into a dataset object call, said dataset object call for obtaining a dataset object;

transmit the dataset object call to the second data object model; and receive said recordset object as a plurality of navigational methods for navigating within a universal web-based active server page framework.

7. The system of claim 6, wherein the at least one processor is to further:

obtain a dataset object in response to said dataset object call;

translate said dataset object into a second recordset object; and transmit said second recordset object to said first data object model.

8. The system of claim 6, wherein the at least one processor is to further:

translate the first recordset object call into the dataset object call within a business logic component associated with said universal web-based active server page framework.

9. The system of claim 6, wherein the at least one processor is to further:

translate the first recordset object call into the dataset object call for calling a plurality of table objects within said universal web-based active server page framework.

10. A non-transitory computer-readable medium storing instructions that upon execution cause a computer system to:

receive a first recordset object call for obtaining a recordset object from the first data object model;

translate the first recordset object call into a dataset object call, said dataset object call for obtaining a dataset object;

transmit the dataset object call to the second data object model; and receive said recordset object as a plurality of navigational methods for navigating within a universal web-based active server page framework.

11. The non-transitory computer-readable storage medium of claim 10, wherein the instructions upon execution cause the computer system to further:

obtain a dataset object in response to said dataset object call;

translate said dataset object into a second recordset object; and transmit said second recordset object to said first data object model.

12. The non-transitory computer-readable storage medium of claim 10, wherein the translating comprises translating the first recordset object call into the dataset object call within a business logic component associated with said universal web-based active server page framework.

13. The non-transitory computer-readable storage medium of claim 10, wherein the translating comprises translating the first recordset object call into the dataset object call for calling a plurality of table objects within said universal web-based active server page framework.

* * * * *